United States Patent [19]

Peerman et al.

[11] 3,717,528
[45] Feb. 20, 1973

[54] FABRIC BONDING WITH THERMOPLASTIC FIBROUS MATS

[75] Inventors: Dwight E. Peerman, Minnetonka; Huibert van Demmeltraadt, Coon Rapids, both of Minn.

[73] Assignee: General Mills, Inc.

[22] Filed: Feb. 5, 1970

[21] Appl. No.: 9,036

[52] U.S. Cl. ............156/179, 156/66, 156/155, 156/290, 156/309, 156/331, 156/334, 161/156
[51] Int. Cl..................B32b 31/04, C09j 7/04
[58] Field of Search..........156/62.2, 62.4, 62.8, 155, 156/167, 179, 181, 247, 276, 279, 290, 291, 66, 106, 309, 331, 334, 168, 178, 180; 117/104; 161/156

[56] References Cited

UNITED STATES PATENTS

| 3,537,947 | 11/1970 | Brazdzionij | 156/279 X |
|---|---|---|---|
| 2,713,078 | 7/1955 | Gros et al. | 117/104 X |
| 2,792,326 | 5/1957 | Doyle et al. | 117/104 A |
| 3,330,713 | 7/1967 | Watson et al. | 156/247 |
| 3,055,788 | 9/1962 | Stanhope et al. | 156/247 |
| 2,130,932 | 9/1938 | Sipe | 156/66 |
| 3,499,853 | 3/1970 | Griebsch et al. | 156/331 |
| 3,383,263 | 5/1968 | Storti | 156/235 |
| 3,629,027 | 12/1971 | Germain | 156/179 X |
| 3,464,876 | 9/1969 | Barb | 156/155 |
| 3,496,042 | 2/1970 | Wyness et al. | 156/155 X |
| 3,442,736 | 5/1969 | Duns | 156/155 X |

Primary Examiner—Carl D. Quarforth
Assistant Examiner—Roger S. Gaither
Attorney—Anthony A. Juettner and Jerome J. Jenko

[57] ABSTRACT

A method of bonding fabrics wherein a fibrous, thermoplastic adhesive is sprayed on the fabric and the bond is formed by heating the fabric and adhesive. The resulting seam or sprayed area is porous, flexible and has good hand.

6 Claims, No Drawings

FABRIC BONDING WITH THERMOPLASTIC FIBROUS MATS

This invention relates to polymers which form a discontinuous, porous adhesive fibrous mat that can be successfully used in the bonding of fabrics. More specifically, this invention relates to thermoplastic polymers, preferably those derived from polymerized fatty acids, diamines, and other coacid monomers which can be used to form a discontinuous, porous, adhesive, fibrous mat.

In the past, various polymers have been used to produce an adhesive system to bond together seams of clothing, and to bond zippers and labels to garments. However, the polymer systems used in the past have had some disadvantages since the bonding was often in the form of an adhesive film applied to the surfaces to be bonded. In addition to the limitations inherent in a film adhesive, the attempted use of various polymers in fabric bondings have been found to be deficient in one or more of the following:

1. insufficient bonding to the fabric,
2. difficult to use,
3. little resistance to dry cleaning or the hot detergents, bleaches, or high temperatures encountered in commercial laundries,
4. too rigid to be comfortable when worn next to the skin,
5. too dark in color or pick up an objectionable color during laundering,
6. lack of porosity in the seam to allow the seam to breathe.

The use of the prior art methods has seriously limited the use of adhesive systems on open face and open weave fabrics. As an example, the conventional adhesive systems are applied as a film to the surface of a base material, for instance the bonding in a woman's slip. To apply a lace applique to the slip, it would be necessary to first apply a film to the tricot and then apply the lace over the adhesive film followed by sealing with heat. In this manner, the applique would be bonded to the surface of the slip. However, the adhesive would show through the lace or applique openings as a very shiny surface. This property is defined herein as showthrough. Showthrough, in delicate work such as the application of lace to a slip, is very undesirable. Likewise, to apply the lace via sewing is very time consuming since the lace pattern would have to be followed to properly attach the lace to the slip. Similarly, when bonding open weave material, the adhesive passes through the openings and appears as a shiny surface (showthrough). An open weave material in which showthrough would be a disadvantage is decorator burlap.

These disadvantages can now be overcome by the use of the adhesive system described herein. The adhesive layer is a fibrous mat which is porous and discontinuous in nature. The mat can be placed between layers of fabric and then heat sealed by applying heat to the fabric. The term "fabric" as used herein is defined as materials made from natural fibers such as cotton, wool, linen, and the synthetic fibers such as nylon, polyester, or polyacrylic fibers, either alone or in mixtures with each other. Thus the term as used herein indicates items having the nature of cloth and items which are normally used where cloth is used, such as clothing, garments, and other wearing apparel and includes woven and so-called non-woven fabrics.

When practicing this invention, a discontinuous layer of adhesive is applied to one of the surfaces to be bonded. Generally, slight pressure and various other means such as direct spraying of the adhesive or heating of the fabric to which the adhesive is to be applied, is sufficient to attach the adhesive prior to completing the bonding process. The second fabric to be bonded may then be placed on the adhesive mat and heat applied to seal the seam.

When practicing this invention, one of the preferred embodiments includes the dissolution of a thermoplastic adhesive in a solvent. The dissolved adhesive can be sprayed in the form of fibers to the surface of the fabric to be bonded. The sprayed fibers will adhere to the surface of the fabric and any residual solvent will either evaporate or pass through any of the openings in the fabric. The fabric to be bonded to the sprayed fabric can then be placed over the sprayed adhesive and heat applied. The duration of the heat application depends upon the thermoplastic adhesive being used as well as the materials being bonded together. Generally, the temperature will be at least 200°F. for a minimum of 5 seconds.

As indicated above, thermoplastic adhesives are used in this invention. Preferred thermoplastic adhesives are the polyamides and polyesters derived from polymerized fatty acids and other polyesters. Among the most successful polymers used as adhesives within the scope of this invention are the polymerized fatty acid polyamides which are the reaction product of polymerized fatty acids and diamines. The polymeric fat acids which may be employed in preparing the polymers are those resulting from the polymerization of drying or semi-drying oils or the free fat acids or simple alcohol esters of these fat acids. The term "fat acids" is intended to include saturated, ethylenically unsaturated and acetylenically unsaturated, naturally occurring, and any synthetic monobasic aliphatic acids containing from 16 to 24 carbon atoms. The term "polymeric fat acid" refers to polymerized fat acids. The term "polymeric fat radical" refers to the hydrocarbon radical of a polymerized fat acid, and is generic to the divalent, trivalent, and other polyvalent hydrocarbon radicals of dimerized fat acids, trimerized fat acids and higher polymers of fat acids. The divalent and trivalent hydrocarbon radicals are referred to herein as "dimeric fat radical" and "trimeric fat radical" respectively.

The saturated, ethylenically unsaturated, and acetylenically unsaturated fat acids are generally polymerized by somewhat different techniques, but because of the functional similarity of the polymerization product, they are generally referred to as "polymeric fat acids".

Saturated fat acids are difficult to polymerize but polymerization can be obtained at elevated temperatures with a peroxidic catalyst such as ditertiarybutyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Suitable polymerization methods are disclosed in U. S. Pat. No. 3,256,304 and No. 3,157,681. The ethylenically unsaturated acids can be polymerized using both catalytic or non-catalytic polymerization techniques.

The preferred aliphatic acids are the mono- and polyolefinically unsaturated 18 carbon atom acids. Representative of such acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo-eleostearic) and the like. A representative 18 carbon atom acid having more than three double bonds is moroctic acid with is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The polymerization of the described ethylenically unsaturated acids yields relatively complex products which usually contain a predominant portion of dimerized acids, a smaller quantity of trimerized and higher polymeric acids and some residual monomers. The dimerized acids, generally containing 32 to 44 carbon atoms can be obtained in reasonably high purity from the polymerization products by vacuum distillation at low pressures, solvent extraction, or other known separation procedures. It is preferred to have a dimer acid content of at least 80 percent, more preferably 90 percent. The polymerization product varies somewhat depending on the starting fat acid or mixtures thereof and the polymerization technique emplyed—i.e. thermal, catalytic, particular catalyst, conditions of pressure, temperature, etc. Likewise, the nature of the dimerized acids separated from the polymerization product also depends somewhat on these factors although such acids are functionally similar.

As a practical matter, the dimeric fat acids are preferably prepared by the polymerization of mixtures of acids (or the simple aliphatic alcohol esters—i.e. methyl esters) derived from the naturally occurring drying and semi-drying oils or similar materials. Suitable drying or semi-drying oils include soybean, linseed, tung, perilla, oiticia, cottonseed, corn, sunflower, dehydrated castor oil and the like. Also, the most readily available acid is linoleic or mixtures of the same with oleic, linolenic and the like. Thus, it is preferred to use as the starting materials, mixtures which are rich in linoleic acid. An especially preferred material is the mixture of acids obtained from tall oil which mixture is composed of approximately 40–45 percent linoleic and 50–55 percent oleic.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined analytically by gas-liquid chromatography of the corresponding methyl esters. Unless otherwise indicated herein, this analytical method was used in the analysis of the polymeric fat acids employed in this invention. Another method of determination is a micromolecular distillation analytical method. This method is that of R. F. Paschke et. al., J. Am. Oil Chem. Soc., XXXI (No. 1), 5, (1954), wherein the distillation is carried out under high vacuum (below 5 microns) and the monomeric fraction is calculated from the weight of product distilling at 155°C., the dimeric fraction calculated from that distilling between 155°C. and 250°C., and the trimeric (or higher) fraction is calculated based on the residue. When the gas-liquid chromatography technique is employed, a portion intermediate between monomeric fat acids and dimeric fat acids is seen, and is termed herein merely as "intermediate", since the exact nature thereof is not fully known. For this reason, the dimeric fat acid value determined by this method is slightly lower than the value determined by the micromolecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

The preferred polymeric fat acid employed must have a dimeric fat acid content determined by gas-liquid chromatography in excess or greater than 80 percent by weight (preferably greater than 92 percent) and a ratio of trimer to monomer (T/M) in the range of about 4–7 percent by weight with an intermediate content not greater than about 4.5 percent by weight and a T/M of at least about 5 percent when the intermediate content is above 3 percent by weight. This latter limitation arises from the fact that the intermediate fraction lying between monomer and dimer functionally behaves at least in part as a monomeric fat acid, experience indicating about 25 percent of the intermediate acts as a monofunctional material. Thus, the trimer content or T/M ratio must be higher as intermediate content is higher in order to compensate for the monofunctional character of the intermediate present in the larger amounts in order to provide adequate melt viscosity properties.

The polyamides of this invention are preferably prepared by reacting the polymeric fat acids with a diamine. Generally the polyamides are prepared by the conventional amidification procedures, usually heating the reactants to a temperature between 100° and 300°C., preferably 225°–250°C., for a time sufficient to complete the reaction, generally 2–8 hours. Essentially molar equivalent amounts of carboxyl and amine groups are employed in preparing the polyamide. The resins may also include other copolymerizing acid and amine components and the copolymerizing acids or diamines employed may be a single diamine or a mixture of two different copolymerizing reactants. In addition, small amounts of monomeric, monocarboxylic acids may be present. With regard to any of the acid components, any of the equivalent amide-forming derivatives thereof may be employed, such as the alkyl and aryl esters preferably alkyl esters having from 1 to 8 carbon atoms, the anhydrides or the chlorides.

The diamines which may be employed may be ideally represented by the formula $$H_2N - R' - NH_2$$

where R' is an aliphatic, cycloaliphatic or aromatic hydrocarbon radical preferably having from two to 40 carbon atoms. Likewise, R' may contain both aliphatic and aromatic hydrocarbon groupings. Illustrative polyamines are ethylenediamine, hexamethylenediamine, tetramethylenediamine, and the like, bis (aminoethyl)benzene, cyclohexyl bis(methyl amine), dimeric fat diamine, etc. The diamine may be employed alone or in mixtures of two or more. The most preferred diamines are the alkylene diamines having two to eight carbon atoms in the alkylene group and mixtures thereof with dimeric fat amines.

The copolymerizing compounds commonly employed are aliphatic, cycloaliphatic or aromatic dicarboxylic acids or esters defined by the formulas:

$$R_1OOC - COOR_1$$

and $$R_{11}OOC-R''-COOR_1$$

where R'' is an aliphatic, cycloaliphatic or aromatic hydrocarbon radical preferably having from one to 20 carbon atoms and $R_1$ is hydrogen or an alkyl group, preferably having one to eight carbon atoms. Such acids include oxalic, malonic, adipic, sebacic, suberic and the like. When copolymerizing dicarboxylic acids are employed with the polymerized fatty acids, it is preferred that the carboxyl groups from the polymeric fat acids should account for at least 50 equivalent percent of the total carboxyl groups.

In addition to the polyamide polymers described above, other polymers have been satisfactorily used within the scope of this invention. The flexible copolyesters are applicable. These polyesters are preferably based on dimer acids, isophthalic acids, terephthalic acids, adipic acid with ethylene glycol or 1,4-butanediol. The dimer acid is generally used in a ratio of up to a maximum of about 70 percent of the terephthalic acid content. These copolyesters are prepared as disclosed in Example V. Other suitable thermoplastic polymers useful within the scope of this invention include the following: vinyl chloride/vinyl acetate copolymers such as a commercially available copolymer comprised of 84 percent polyvinyl chloride and 16 percent polyvinyl acetate; thermoplastic polyurethanes such as those obtained by reacting a polyether and diisocyanate, e.g. the glycol of dimer acid and isophorone diamine diisocyanate in the presence of a catalyst, e.g. dibutyl tin dilaurate. Other thermoplastic polymers useful within the scope of this invention will be readily apparent to those skilled in the art. The glycols of dimer acid can be prepared as disclosed in U. S. Pat. No. 2,347,562.

When filament spraying the adhesive, the thermoplastic polymer is dissolved in a solvent which is capable of rapidly evaporating and sprayed from solution to form a fibrous mat. The solvents useful in this invention are those which dissolve the polymer resin and have an evaporation rate of less than 5.5, preferably less than 3.0. The term "evaporation rate" as used herein is defined as the ratio of time required for a given volume of the solvent to evaporate at $73.5°\pm2°F$. and $50\pm4$ percent relative humidity when compared to the same volume of diethyl ether which is assigned the value of 1. A suitable testing procedure is given in the Paint Industry Magazine, Vol. 76, No. 4, p. 15, April 1961. To determine whether or not a solvent would dissolve the polymer, the mixture of solvent and polymer was placed in a conventional paint shaker for one hour of shaking. If at the end of that time, the resulting liquid phase of the mixture was not clear, the system was determined to be incompatible. It has been found that chlorinated hydrocarbon solvents with a suitable evaporation rate work most satisfactorily. Solvents can generally be classified into three categories; very useful solvents having an evaporation rate of less than 3.0, operable solvents having an evaporation rate of about 5.5–3.0, and unsitable solvents having an evaporation rate of above 5.5. Illustrative of evaporation rates of some representative solvents are listed as follows:

| Group | Solvent | Evaporation Rate |
|---|---|---|
| I | Methylene chloride | 1.8 |
| | Tetrahydrofuran | 2.0 |
| | Chloroform | 2.2 |
| | Methyl chloroform (1,1,1-trichloroethane) | 2.7 |
| II | Methanol | 5.2 |
| III | Ethanol | 7.0 |
| | n. propanol | 7.8 |

Various mixtures of solvents can be used so long as they fall within the suitable evaporation rate. For instance, small amounts of solvents which by themselves would be within Groups II or III can be mixed with larger amounts of Group I and still have an evaporation rate of less than 5.5. It is therefore possible to have binary solvent systems. Suitable mixtures include tetrahydrofuran with small amounts of methanol, and fluoronated hydrocarbons (Freon) and other commercial propellants with small amounts of alcohols which induce solubility and have the desired evaporation rate.

When spraying the polyamide resins from the solvent mixtures as described above, it has been found that the viscosity can significantly influence the type of web effect obtained. Generally, the viscosity of the resin is a function of the molecular weight and is the determinant of solution viscosity and product performance. The following shows the relation of the spray solution viscosity ranges:

Low viscosity — 0.5 – 10.0 centipoises
Medium viscosity — 10.0 – 65.0 centipoises
High viscosity — 65.0 – 100.0 centipoises Generally, a low viscosity, e.g., 0.5–10.0 cp., produces a finely divided fibrous spray which is solvent saturated when airborne in the spray. Since a large percentage of the atomized solvent is carried to and deposited on the substrate, the short resin fibers are partially redissolved giving a mat surface of unusual continuity. Generally, it is necessary to obtain an optimum balance between solids content of the solution, discharge rate and solvent evaporation rate. It is also known that as the viscosity increases, the solvent solution containing the resin becomes more difficult to discharge and atomize and the resulting fibrous texture of the mat eventually resembles a spattering of individual globules. Likewise, the bulk density of the mat increase with an increase in solution viscosity. Also, as is shown in the examples, the higher viscosity resins result in greater tensile strength and better elongation.

When spraying the copolyesters, the above solvent requirements are also applicable. Suitable solvents include chloroform, methylene dichloride, and blends thereof.

Various methods of spray application have been found to work satisfactorily. These include air gun spraying, aerosol spraying, air brush, and other conventional methods of spray application. The optimum spraying conditions can be easily obtained by simple spray testing techniques. An important element for an aerosol application is proper selection of the valve assembly. A useful nozzle is a Model 103 Newman-Green spray head having a 0.055 inch slot and a 0.060 inch orifice and a vapor tap hole in the capillary dip tube enlarged to 0.050 inch. Other methods of application will be readily apparent to those skilled in the art.

As indicated above, various polymers can be utilized in the formation of fibrous mats which are used as fabric adhesives. They are characterized as having a degree of solubility in organic solvents sufficient to be applied by the spray method. The mat thus formed may be sprayed directly on the fabric or on a releasing surface from which the fibrous mat may be stripped as a self-supporting fibrous web or mat. In general, the preferred type of polymers are those which have low tensile modulus and resistance to laundering coupled with good color and high peel strength.

This invention will be further illustrated and is not intended to be limited by the following examples.

Example I

A polyamide was prepared from polymerized tall oil fatty acids and hexamethylene diamine by charging 100.0 lbs. of polymerized fatty acid into the reactor along with 33.0 lbs. of azelaic acid and 4.50 lbs. of ethylenediamine and 18.29 lbs. of the hexamethylene diamine. The polymerized fatty acid had the following properties:

| | |
|---|---|
| % M (Monomer) | 1.3 |
| % I (Intermediate) | 4.2 |
| % D (Dimer) | 92.8 |
| % T (Trimer) | 1.7 |
| Equivalent Wt. | 285 |

A color remover, a 10 percent solution of phosphoric acid in an amount of 150 grams, and Antifoam A (Dow-Corning as a 1 percent solution in xylene in an amount of 20 grams was added to the reactor. The above reactants were heated to 250°C. over a period of 3 hrs. and the temperature was held at 250°C. for 4 hrs. The resulting polyamide had the following analysis:

| | |
|---|---|
| Meq. acid/kg. | 15.9 |
| Meq. amine/kg. | 122.3 |
| T.S. (Tensile Strength) | 4016 psi |
| Y.S. (Yield Strength) | 289 psi |
| % Elongation | 653 |
| M.I. (Melt Index at 175°C.) | 5.5 |

A solution containing the above resin was prepared by mixing the following:

| | Parts by Weight |
|---|---|
| Polyamide resin | 13.6 |
| Methanol | 13.6 |
| Dichloromethane | 59.2 |
| Tetrahydrofuran | 13.6 |

This solution had a Gardner viscosity of A. The solution was charged to a DeVilbiss spray gun and the pressure set at 30 psi. The mixture was sprayed onto a Teflon coated glass cloth. The evaporation rate of the solvent resulted in the polymer being deposited on the cloth as a fibrous, discontinuous, porous mat. The fibrous mat was cut into ¼ inch strips and used to bond 10 inch zippers to a medium weight wash-and-wear fabric of 50 percent cotton and 50 percent polyethylene terephthalate polyester fiber (Dacron). The fibrous mat was placed over the fabric and the zipper tape placed on top of the fibrous mat. The fabrics were then bonded with a household iron at a temperature of 280°F. for 30 Seconds. No showthrough was evident, The peel strength of the bond was then determined in the following manner.

The top end of the zipper was pulled by hand to obtain a tab to insert into the jaws of an Instron tester. The corresponding tabs of the wash-and-wear fabric was inserted in the other jaw of the Instron tester and the zipper was stripped from the fabric at 2 inches/minute. The peel strength which resulted was 4.65 lbs./in. and the shear strength was 41.8 psi with 100 percent fabric failure.

Example II

Example I was repeated except that the temperature of the hand iron was increased to 310°F. The peel strength increased to 6.17 lbs. and the shear strength to 44 psi with 100 percent fabric failure. The bonding procedure was repeated and the temperature of the hand iron was 380°F. A peel strength of 8 lbs./in. was obtained and the shear strength was 48.3 psi, the failure being 100 percent in the fabric. The shear strength in Examples I and II was obtained by pulling the specimen in the direction transverse to the long axis of the zipper.

Example III

A polyamide polymer was prepared as follows. The fat acid dimer in an amount of 183.2 lbs. was reacted with 55.0 lbs. of hexamethylene diamine. The above reactants were heated to 250°C. over a period of 1 ¾ hrs. The temperature was held at 250°C. for 7 ½ hrs. The resulting polyamide had the following analysis:

| | |
|---|---|
| Meq. acid/kg. | 37.1 |
| Meq. amine/kg. | 6.7 |
| Ball & Ring Softening Point | 103°C. |

Two solutions were prepared as follows:

Solution 1:

| | Parts by Weight |
|---|---|
| Polyamide Resin from Example 1 | 13.6 |
| Methanol | 10 |
| Dichloromethane | 59.2 |

| | |
|---|---|
| Tetrahydrofuran | 17.2 |
| Solution 2: | |
| Polyamide Resin from Example III | 13.6 |
| Methanol | 10.2 |
| Dichloromethane | 59.2 |
| Tetrahydrofuran | 17.2 |

The two solutions were then blended in an amount of 67 parts by weight of Solution 1 and 33 parts by weight of Solution 2. The blend was a homogeneous, clear, and mutually compatible mixture. The solution was lightly sprayed as in Example I to form a discontinuous mat of randomly arranged fibers on the back side of a flower pattern lace applique. The lace applique was a very open, delicate design prepared on an embroidering machine. The applique with the adhesive mat was then placed over a knit nylon tricot so that the adhesive was in contact with the tricot. A flat iron set at 350°F. was placed over the area to be bonded for 10 seconds. The lightly sprayed applique had a peel value of 2.0 lbs./in. The procedure was repeated by spraying a medium weight of the spray to the lace applique. After applying the applique as in this example, the applique had an average peel value of 5.0 lbs./linear inch.

In a non-uniform surface such as lace and appliques, peel values must be taken as a measurement of a number of specimens because of the wide variation from one point of the applique to another. The values given above represent the averages of several measurements of peel value from several sections of the bonded specimens. The above bonds demonstrated good hand and the fibrous mat after bonding did not leave any showthrough in the openings in the lace structure. This is in direct contrast to extruded film which leaves a shiny resin film showing in the openings of the lace. In the application of lace or appliques to lingerie type material, the fibrous mat has the advantage of disappearing after bonding and of giving a much more flexible hand to the bonded area.

Example IV

This example will illustrate the relative efficiency of bonding fabric with a discontinuous fibrous mat as compared to extruded film. A section of the sprayed mat from Example I was cut into a strip of adhesive of 1 in. by 6 in. A film 5 mm thick was extruded from the resin of Example I in a conventional extruder. The film weighed 0.275 grams and was 1 ½ in. by 6 in. long. The film and the mat were each used to bond a cotton label to a 100 percent pima cotton fabric of a weight suited for production of a mens' shirt. The adhesive was placed on the cotton fabric and the label placed over the adhesive. The labels were then attached at 275°F. at 150 psi pressure with the results as indicated below.

TABLE I

| Product | Weight, gm. | Bonding Time sec. | Peel Strength lbs./in. |
|---|---|---|---|
| Film | 0.275 | 5 | 11.01 |
| Mat | 0.151 | 5 | 8.9 |
| Mat | 0.197 | 10 | 11.04 |
| Mat | 0.231 | 5 | 11.07 |

This example demonstrates that the fibrous mat is more efficient per weight of polymer used than is the polymer in the form of an extruded film. Thus, the discontinuous, porous adhesive mat is superior to an extruded adhesive film.

Example V

An ethylene glycol polyester was prepared from a hydrogenated distilled dimer acid and terephthalic acid. The dimer acid had the following properties:

| | |
|---|---|
| % M | 0.5 |
| % I | 4.2 |
| % D | 95.1 |
| % T | 0.2 |
| Acid value | 0.3 |
| I V | 8.0 |
| Sap. value | 189.2 |

The polyester was prepared by heating together 401 grams of hydrogenated distilled dimer methyl esters, 404 grams of dimethyl terephthalate, 378 grams of ethylene glycol, 0.20 grams of zinc acetate times $2H_2O$, and 0.24 grams of antimony trioxide at up to 240°C. until 234 ml. of methanol had been evolved. Vacuum was then applied while the temperature was maintained at 260°C. for 2 hours. The product was discharged. A polyester solution was then prepared as follows:

Solution A:

| | Parts by Weight |
|---|---|
| Polyester | 10 |
| Methylene dichloride | 90 |
| Gardner viscosity = A-4 | (0.22 Stokes) |

Solution B:

| | |
|---|---|
| Polyester | 12.5 |
| Chloroform | 87.5 |
| Gardner viscosity = A | (0.5 Stokes) |

Solution C:

| | |
|---|---|
| Polyester | 10 |
| Chloroform | 16 |
| Methylene dichloride | 74 |
| Gardner viscosity | |

Each of these solutions was sprayed as in Example I to form a discontinuous adhesive mat. The mat was then used to bond a pima cotton at a bonding temperature of 350°F. and a dwell time to achieve optimum bonding for a given weight of mat. In each case, 3 sq. in. of the mat was tested. The results are summarized in the table below:

TABLE II

| Solution | weight | psi | Time sec. | Peel Strength lbs./in. |
|---|---|---|---|---|
| A | 0.220 | 150 | 5 | 5.3 |
| A | 0.219 | 150 | 8 | 5.7 |
| A | 0.324 | 300 | 10 | 11.6 |
| A | 0.402 | 150 | 8 | 8.7 |
| B | 0.174 | 150 | 5 | 1.3 |
| B | 0.192 | 150 | 5 | 4.2 |
| B | 0.210 | 150 | 8 | 5.2 |
| C | 0.273 | 150 | 5 | 7.1 |
| C | 0.169 | 150 | 5 | 4.7 |
| C | 0.299 | 150 | 8 | 7.2 |
| C | 0.139 | 150 | 8 | 3.1 |
| C | 0.360 | 150 | 5 | 6.9 |

Example VI

A polyurethane was obtained by reacting the glycol of dimer fatty acid with isophorone diamine diisocyanate in an excess of about 1 percent along with a catalyst, dibutyl tin dilaurate. The mixture was blended for 10–15 min. and then placed under vacuum for 5 hrs. in a temperature varying from 80°-108°C. The thermoplastic polyurethane resulting from this treatment was dissolved at 4.4 percent solids content in methylene dichloride. The solution was sprayed at 45 psi to form a fibrous mat. Two mats were obtained by spraying for different lengths of time, one mat weighing 0.35 g./sq. in. and another mat weighing 0.070 g./sq. in. The mats were dried by allowing the solvent to evaporate at room temperature. The thermoplastic polyurethane mat weighing 0.35 g./sq. in. was then bonded to a fabric blend of 65 percent polyethylene terephthalate polyester/35 percent cotton at 380°F. and a home flat iron applied to the bond with a force of 18 lbs./30 sec. dwell time. The bonds were made by placing a layer of fabric, then a layer of the fibrous web, followed by another layer of the fabric, and bonding as indicated above. The bond thus formed had good hand and exhibited no showthrough. The peel strength of the bond had a value of 3.22 lbs./linear in. when tested on the Instron tester.

Example VII

A thermoplastic polyurethane was prepared by reacting the glycol dimer fatty acid with 2,2,4-trimethyl hexamethylene diisocyanate in an excess of about 2 percent of the diisocyanate. The catalyst was the same as in Example VI. The materials were reacted as in Example VI for 2 ¼ hours at 80°C. A solution of 7.8 percent of the polyurethane in methylene dichloride was sprayed under an atomizing pressure of 45 psi, thereby forming a fibrous mat. The fibrous mat produced had a density of 0.75 g./sq. in. The mat of this example was bonded as in Example VI except that the flat iron was set at 350°F. The bond produced a very good hand and had a peel value of 8.45 lbs./in. The bonds of Examples VI and VII appeared to be very flexible and could be stretched without parting.

Example VIII

A commercially available vinyl chloride/vinyl acetate copolymer, VYHH, which consists of 84 percent polyvinyl chloride and 16 percent polyvinyl acetate was dissolved in methylene dichloride at 16.2 percent solids content. The mixture was sprayed at 40 lbs./sq. in. and formed a fibrous mat of very short fibers. A mat weighing 0.057 g./sq. in. was then bonded as in Example VII and had a bond value of 5.06 lbs./linear in. When the bond time is reduced to 15 sec., the bond value was 3.06 lbs./sq. in.

Example IX

Example VIII was repeated except that the copolymer was compounded with 30 percent by weight of dioctylphthalate based on the weight of the resin. The solution of the thermoplastic resin was then dissolved in methylene dichloride as in Example VIII and sprayed at 30 psi to form medium length fibers. The fibrous mat was then bonded at 350°F. on a hand iron under 18 lbs. force for 15 and 30 sec. The mat weighed 0.075 g./sq. in. and the bonds produced when bonded to the same material as in Example VI, were very stiff and exhibited poor hand. The 15 sec. dwell time bond had a bonded value of 5.78 lbs./linear in. and the 30 sec. dwell time had a bonded value of 6.39 lbs./linear in.

The bonded seams have held up to conventional type laundering. It is understood that garments having lace appliques attached thereto do not generally require the same laundering conditions that would be encountered in such things as mens' shirts, childrens' playclothes, etc. The method of bonding as disclosed herein would be very suitable for attaching crocheted or embroidered decals or appliques to fabrics of all types.

In addition to the advantages derived in the open weave bonding, the adhesive when applied as disclosed herein produces a greatly enhanced hand of the bonded area.

The bonded area when prepared as disclosed herein produces a final product that is porous in nature and allows for normal breathing in the garment. Since the mat produces a non-uniform surface, the area to be bonded requires less pressure to be applied to the surface of the fabric then the conventional film adhesives. Light pressure is especially advantageous for bonding delicate fabrics and appliques to all types of fabrics. Further embodiments will be readily apparent to those skilled in the art.

The embodiments of the invention in which an exclusive property or privilege is claimed are defined as follows:

1. A method of bonding fabrics with a porous, discontinuous fibrous thermoplastic adhesive mat comprised of
    a. placing the fibrous adhesive mat on a fabric surface, thereby leaving one surface of the adhesive exposed,
    b. placing a fabric on the exposed side of the adhesive,
    c. heating the fabric and adhesive mat to a sufficiently high temperature and for a sufficient period of time to bond the fabric surfaces together
    wherein the thermoplastic adhesive is a polyamide of a polymerized fatty acid having a dimer content of greater than 80 percent and a diamine of the formula $H_2N-R-NH_2$ wherein R is an aliphatic, cycloaliphatic or aromatic hydrocarbon radical of two to 40 carbon atoms.

2. The method of claim 1 wherein the diamine is an alkylene diamine wherein the alkylene radical is two to eight carbon atoms.

3. The method of claim 2 wherein the diamine is hexamethylene diamine.

4. The method of claim 1 wherein the polymeric fat acid is a polymerized monocarboxylic acid having from 16–24 carbon atoms.

5. The method of claim 7 wherein the monocarboxylic acid has 18 carbon atoms.

6. The method of claim 1 wherein 25–75 carboxyl equivalent percent of the polymerized fat acid is a copolymerizing acid of the formula $HOOC-R-COOH$ wherein R is an aliphatic hydrocarbon radical of six to 12 carbon atoms.

* * * * *